US010365921B2

(12) United States Patent
Schmidt et al.

(10) Patent No.: US 10,365,921 B2
(45) Date of Patent: Jul. 30, 2019

(54) METHOD, HEAD UNIT, AND VEHICLE FOR INTRODUCING APPLICATIONS INTO THE HEAD UNIT OF THE VEHICLE

(71) Applicant: Bayerische Motoren Werke Aktiengesellschaft, Munich (DE)

(72) Inventors: Andre Schmidt, Leipzig (DE); Maximilian Michel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 4 days.

(21) Appl. No.: 15/843,230

(22) Filed: Dec. 15, 2017

(65) Prior Publication Data

US 2018/0113704 A1   Apr. 26, 2018

Related U.S. Application Data

(63) Continuation of application No. PCT/EP2016/063005, filed on Jun. 8, 2016.

(30) Foreign Application Priority Data

Jun. 17, 2015  (DE) .......................... 10 2015 211 146

(51) Int. Cl.
*G06F 8/61*  (2018.01)
*G06F 8/65*  (2018.01)
*H04L 29/08*  (2006.01)

(52) U.S. Cl.
CPC ................. *G06F 8/65* (2013.01); *G06F 8/61* (2013.01); *H04L 67/12* (2013.01); *H04L 67/34* (2013.01)

(58) Field of Classification Search
CPC ... G06F 8/60–8/71; H04L 67/12; H04L 67/34

(Continued)

(56) References Cited

U.S. PATENT DOCUMENTS

| 7,421,322 B1 * | 9/2008 | Silversmith .......... G06Q 10/087 701/29.6 |
| 2003/0171111 A1 * | 9/2003 | Clark ...................... H04L 67/14 455/414.1 |

(Continued)

FOREIGN PATENT DOCUMENTS

| DE | 10 2008 008 228 A1 | 8/2009 |
| DE | 10 2012 220 132 A1 | 5/2014 |

OTHER PUBLICATIONS

Odat, H., et al., Firmware Over the Air Ad-Hoc Network, FOTANET, IEEE International Conference on Electro/Information Technology (EIT), May 21-23, 2015, 6 pages, [retrieved on Apr. 17, 2019], Retrieved from the Internet: <URL:http://ieeexplore.ieee.org/>.*

(Continued)

*Primary Examiner* — Geoffrey R St Leger
(74) *Attorney, Agent, or Firm* — Crowell & Moring LLP

(57) ABSTRACT

A method introduces applications into a head unit of a vehicle. The method transfers a first identifier by a software component of the head unit via a first communication channel to a server; receives a main application in response to the transferring; transfers a vehicle identification number of the vehicle by the main application via a second communication channel to the server; receives metadata associated with the vehicle identification number, wherein the metadata include one or more identifiers; transfers at least one identifier of the received metadata from the main application to the software component; transfers the identifier by an invariable software component via the first communication channel to the server; receives an application associated with the identifier by the software component; saves the application; and forwards a storage location of the application from the software component to the main application.

10 Claims, 1 Drawing Sheet

(58) Field of Classification Search
USPC .................................................. 717/168–178
See application file for complete search history.

(56) References Cited

U.S. PATENT DOCUMENTS

| | | | | |
|---|---|---|---|---|
| 2005/0216903 | A1* | 9/2005 | Schaefer ................ | G07C 5/008 717/168 |
| 2008/0102854 | A1* | 5/2008 | Yi ..................... | H04L 29/12283 455/456.1 |
| 2009/0070488 | A1* | 3/2009 | Bruenner ............ | H04L 61/2015 709/245 |
| 2009/0119657 | A1* | 5/2009 | Link, II ................... | G06F 8/64 717/171 |
| 2011/0320089 | A1* | 12/2011 | Lewis ................... | G01C 21/32 701/29.6 |
| 2012/0029762 | A1* | 2/2012 | Ubik ...................... | G07C 5/008 701/29.6 |
| 2012/0030512 | A1 | 2/2012 | Wadhwa et al. | |
| 2012/0198080 | A1* | 8/2012 | Yang ................... | H04L 61/2015 709/227 |
| 2013/0031540 | A1* | 1/2013 | Throop .................. | G06F 8/654 717/173 |
| 2013/0309977 | A1* | 11/2013 | Heines ...................... | G06F 8/70 455/67.7 |
| 2015/0081858 | A1* | 3/2015 | Gel .......................... | G06F 8/61 709/221 |
| 2015/0100782 | A1* | 4/2015 | Gautama ................... | H04L 9/32 713/168 |
| 2015/0193219 | A1* | 7/2015 | Pandya ...................... | G06F 8/65 717/171 |
| 2015/0242198 | A1* | 8/2015 | Tobolski ................... | G06F 8/61 717/172 |
| 2015/0282230 | A1* | 10/2015 | Kim ...................... | H04W 76/14 370/329 |
| 2016/0265925 | A1* | 9/2016 | Ma ........................ | H04W 4/029 |

OTHER PUBLICATIONS

Mansor, H., et al., Don't Brick Your Car: Firmware Confidentiality and Rollback for Vehicles, 10th International Conference on Availability, Reliability and Security, 2015, pp. 139-148, [retrieved on Apr. 17, 2019], Retrieved from the Internet: <URL:http://ieeexplore.ieee.org/>.*

International Search Report (PCT/ISA/210) issued in PCT Application No. PCT/EP2016/063005 dated Aug. 30, 2016 with English translation (Four (4) pages).

German-language Written Opinion (PCT/ISA/237) issued in PCT Application No. PCT/EP2016/063005 dated Aug. 30, 2016 (Seven (7) pages).

* cited by examiner

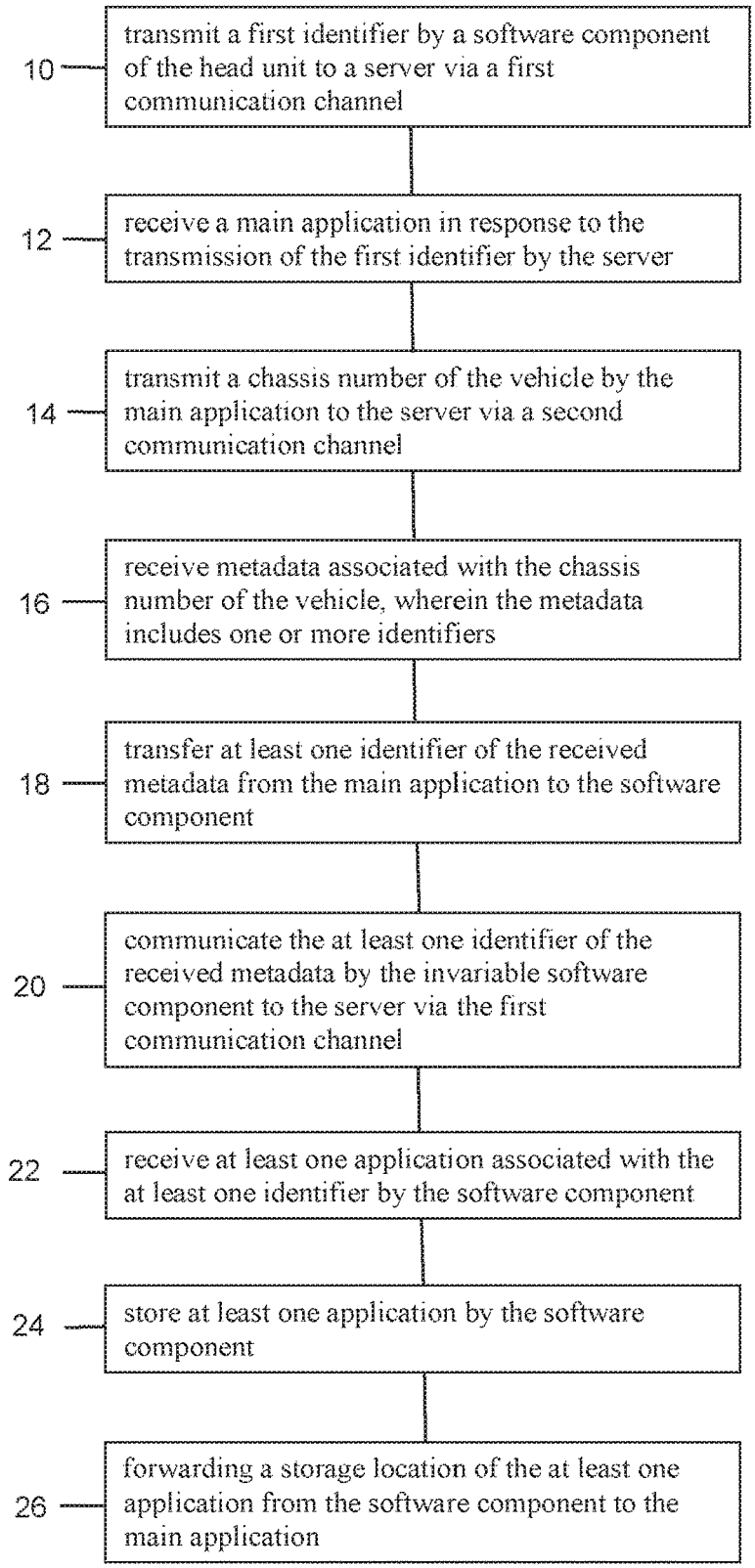

METHOD, HEAD UNIT, AND VEHICLE FOR INTRODUCING APPLICATIONS INTO THE HEAD UNIT OF THE VEHICLE

CROSS REFERENCE TO RELATED APPLICATIONS

This application is a continuation of PCT International Application No. PCT/EP2016/063005, filed Jun. 8, 2016, which claims priority under 35 U.S.C. § 119 from German Patent Application No. 10 2015 211 146.6, filed Jun. 17, 2015, the entire disclosures of which are herein expressly incorporated by reference.

BACKGROUND AND SUMMARY OF THE INVENTION

The invention relates to a method, a head unit and/or a vehicle equipped with the head unit for introducing applications into the head unit of the vehicle. In particular, the invention relates to the flexible and/or secure introduction of applications into the head unit of a vehicle.

At present, in vehicles, in particular in motor vehicles, head units are used which employ integrated web browsers in order to display, in a head unit, web pages which are loaded from a server onto the head unit via a communication module of the vehicle using known web technologies. The contents of the loaded web pages correspond generally to the contents which are made available to the user via the head unit. The transmission of the web pages takes place at the user's request, with the result that the contents of the web pages are not available until after the loading process from the server.

An object of the invention is therefore to provide an improved method of introducing applications into a head unit of a vehicle. In particular, an object of the invention is to make efficient introduction of dynamic contents into a head unit of a vehicle possible.

This and other objects are achieved by a method for introducing applications into a head unit of a vehicle. The method comprises transmission of a first identifier by a software component of the head unit to a server via a first communication channel. The first identifier can be, for example, a uniform resource locator, URL for short. The URL can be transmitted, for example, in an http request to the server. The method also comprises the reception of a main application in response to the transmission of the first identifier by the server, the transmission of a vehicle identification number of the vehicle by the main application to the server via a second communication channel, and the reception of metadata associated with the vehicle identification number of the vehicle, wherein the metadata comprises one or more identifiers. The vehicle identification number can preferably be transmitted between the head unit and the server whenever data is transmitted, for example whenever there is a request to the server. In addition, the method comprises transfer of at least one identifier of the received metadata from the main application to the software component, communication of the at least one identifier of the received metadata by the invariable software component to the server via the first communication channel, reception of at least one application associated with the at least one identifier by the software component, storage of the at least one application by the software component, and passing on of a storage location of the at least one application from the software component to the main application.

Advantageously, applications can be introduced in an easy and/or flexible way into the head unit of a vehicle according to the invention. In addition, applications can be adapted dynamically to the respective vehicle configuration. Changes after the production of the vehicle are also possible at any time, with the result that the applications for the head unit of a vehicle are made available to the user dynamically. In this context, the method can already load applications, for example all available applications onto the head unit in advance so that they can be made available to the user quickly and/or even when there is a failure or non-availability of a communication channel to the server.

According to one advantageous configuration, the first identifier can denote a storage location of the main application on the server, and/or the software component can be an invariable software component, and/or the software component can be a native software application of the head unit. The configuration of the introduction of the applications can be simplified efficiently by the use of an identifier which denotes the storage location of the main application. The configuration of the main unit during the production of the vehicle can preferably be simplified. The security of the head unit can be increased through the use of an invariable software component. In addition, the transmission and processing of the data by the software component can be carried out more efficiently by using a native software component. In particular, gains in efficiency can be made in the case of a head unit with low computational power.

According to a further advantageous configuration, the first communication channel and the second communication channel can be encrypted communication channels. Through the use of encrypted communication channels it is possible to increase the security efficiently when transmitting metadata, archive files and/or applications. In addition, the security can be increased further through the use of two different encrypted communication channels.

According to a further advantageous configuration, the transmission of the first identifier can take place after the start of the invariable software component, after the start of a communication unit of the head unit, as a function of a time-based parameter and/or by means of interaction of the user with the head unit. In this way, the transmission and configuration of the main application of the head unit can be controlled in a flexible manner.

According to a further advantageous configuration, the metadata can include a URL for an application, a hash value of the application and/or a version number of the application. Through the use of a URL it is possible for a simple identification of the application to take place. In addition, the hash value can be used for validating the application with respect to possible manipulations of the application by third parties, and therefore the security of the introduction of the applications into the head unit can be increased further.

According to a further advantageous configuration, the identifier of the metadata can include a URL for an archive file of the application and the hash value of the archive file of the application. Through the use of a URL it is possible for simple identification of the application to be carried out. In addition, the hash value can be used to validate the application with respect to possible manipulations of the application by third parties, and can therefore further increase the security of the introduction of the applications into the head unit.

According to a further advantageous configuration, the reception of the application by the software component can include validation of an archive file of the application and unpacking of the archive file if the validation of the archive file is successful. The security of the introduction of the application into the head unit can be increased by the validation of the archive file.

According to a further advantageous configuration, the method can also include the updating of the at least one application by the main application. As a result of the possibility of updating the applications of the head unit it is possible for the head unit always to be supplied with a current version of the application. The user can therefore be supplied directly and/or automatically with further developments of the applications.

According to a further advantageous configuration, the updating of the at least one application can include transmission of the vehicle identification number of the vehicle by the main application to the server via a second communication channel, reception of updated metadata associated with the vehicle identification number of the vehicle, wherein the metadata comprises one or more identifiers, and comparison of the updated metadata with the metadata. If the updated metadata deviates from the metadata, the method can include the transfer of at least one identifier of the updated metadata from the main application to the software component, communication of the at least one identifier of the updated metadata by the invariable software component to the server via the first communication channel, reception of at least one updated application associated with the at least one identifier by the software component, and forwarding the at least one updated application from the software component to the main application in order to replace the at least one application by the at least one updated application. In this way, simple, flexible, and/or efficient updating of the applications by the main application can take place. The updating can take place, for example, in a time-based and/or event-based fashion, and can therefore be controlled in a flexible fashion.

The invention is also distinguished by a head unit of a vehicle, wherein the head unit has stored therein instructions which are designed to execute the method described above.

The invention is also distinguished by a vehicle equipped with a head unit, wherein the head unit includes instructions which are designed to execute the method described above.

BRIEF DESCRIPTION OF THE DRAWING

FIG. 1 is a high-level flow chart illustrating the method for introducing applications into a head unit of the vehicle in accordance with an embodiment of the invention.

DETAILED DESCRIPTION OF THE DRAWING

A method is provided for securely introducing applications into communication systems of vehicles and, in particular, into a head unit of a vehicle. One or more applications can firstly be stored and/or saved on a server. The applications can be stored as archive files. The archive files can be compressed files which can be generated with customary tools. The archive files are preferably signed by means of a cryptographic hash function. For example, the archive files can be signed with an SHA algorithm, an MD5 algorithm, and/or some other cryptographic hash function. The server can store the archive files and/or the associated signatures. The signing of the archive files can preferably prevent the archive files being changed, in order to insert, for example, malicious code which is transmitted into a vehicle from the server when an archive file is transmitted to the vehicle from the server, and/or unsigned, and therefore potentially insecure applications are loaded into a vehicle from the server.

The signing of the applications can preferably be performed by a computer which does not have any access to public networks and only permits specific, trustworthy persons to carry out the signing of the applications. Signed archive files and/or the associated signatures can be loaded into the server from the computer which signs the applications. Access authorizations on the server can ensure that only the computer which signs the applications can transmit the signed archive files and/or the associated signatures onto the server. After the transmission of the signed archive files and/or the associated signatures, they are available on the server and can be transmitted to one or more vehicles. The applications which are stored in the archive files can include, for example, main applications for different vehicles and/or apps.

Referring to the flow chart of FIG. 1, the method for introducing applications into the head unit of a motor vehicle is shown. The method includes the act of transmitting a first identifier by a software component of the head unit to a server via a first communication channel (10). The method receives a main application in response to the transmission of the first identifier by the server (12). The method transmits a vehicle identifier number of the vehicle by the main application to the server via a second communication channel (14). The method receives metadata associated with the vehicle identifier number of the vehicle, wherein the metadata includes one or more identifiers (16). The method transfers at least one identifier of the received metadata from the main application to the software component (18). The method communicates the at least one identifier of the received metadata by an invariable software component to the server via the first communication channel (20). The method receives at least one application associated with the at least one identifier by the software component (22). The method stores at least one application by the software component (24). The method passes on a storage location of the at least one application from the software component to the main application (26). Each of the above method acts are discussed in greater detail below.

One or more archive files and therefore one or more applications of the server can be requested by a vehicle. In detail, an invariable software component of a communication system of the vehicle can load a main application from the server. Invariable means within the context of the software component that the software component is written once into a head unit during the production of the head unit and/or the rights are subsequently changed in such a way that the software component can only be read and/or executed. Updating of the invariable software component can, for example, only be carried out by workshops with special rights. Updating of the invariable software component cannot be carried out by a user, for example a vehicle owner. The invariable software component can be a native application of the communication system. The main application can be a non-native application of the communication system. The communication system can include a head unit and/or a communication unit of the vehicle. The head unit of the vehicle is preferably coupled to the communication unit of the vehicle. The communication unit can be integrated, for example, in the head unit. The communication unit can make available a communication channel via a wireless interface with which the head unit can communicate with the server. The communication channel between the communication unit or the head unit and the server can be encrypted.

The main application can be a management app. The main application can be adapted vehicle-specifically and/or to the head unit. The main application is preferably a java script application. The main application can be downloaded onto the head unit from the server according to a predefined logic. For example, the main application can be downloaded to the head unit from the server after the starting of the communication unit and/or starting of the head unit. For example, the main application can be downloaded according to predefined time criteria and/or predefined user interactions. A storage location of the main application on the server can be defined by a configuration system. The storage location can be defined, for example, during production and during the entire lifecycle of the vehicle, the head unit and/or the communication unit. In addition, the storage location of the main application can be transmitted during production or during the entire life cycle of the vehicle, into the vehicle, preferably into the communication unit and/or the head unit of the vehicle, from the configuration system via an encrypted communication channel. The storage location of the main application can be an identifier. The storage location of the main application can be a uniquely defined identifier. For example, a uniform resource identifier, URI for short, can be used as an identifier.

In order to load or transmit the main application from the server to the head unit, the invariable software component of the head unit can set up a communication channel to the server via the communication unit. After the setting up of the communication channel, the invariable software component can transmit the storage location or saving location of the main application to the server via the communication channel. The server can process the storage location of the main application and transmit the associated main application in response. For example, the server can transmit the signed archive file of the main application and/or the associated signature of the main application to the head unit. The head unit can receive the signed archive file of the main application and/or the associated signature and check the signature. If the signature checking is successful, the head unit or the invariable software component of the head unit can unpack and execute the received archive file. The main application can therefore be installed and/or executed in the head unit.

After the installation or the execution of the main application, the main application can set up a further communication channel to the server. To this, the main application can connect to the server via a secure communication channel, e.g. HTTPS. The main application can retrieve a list of metadata of applications from the server. In order to receive the correct list of metadata for a specific vehicle, the main application can transfer the vehicle identification number of the vehicle to the server. The server can identify the vehicle and/or equipment or configuration of the vehicle unambiguously by means of the vehicle identification number and/or a registered and/or authenticated user. In other words: the assignment of the applications to a specific vehicle can be made by use of the vehicle identification number. The list of metadata can comprise, for example, one or more identifiers for designating applications and/or archive files of the applications of the server. In detail, the metadata can comprise a uniform resource locator, URL for short, relating to the location of the signed archive file of the application, an associated signature, for example a hash value, a version identifier of the application and/or further configuration parameters.

The main application of the head unit can receive the metadata, comprising one or more identifiers, via the further communication channel. The head unit can transfer one or more identifiers of the received metadata subsequent to the invariable software component. The main application of the invariable software component can preferably transfer the URL and the hash value of the archive file to an application. After the reception of the identifiers by the main application via the communication channel of the invariable component, the invariable software component can download the archive file from the server onto the head unit. For this purpose, for example, the invariable software component can communicate to the server the URL of the archive file to be transmitted. In response to the transmitted URL, the server can transmit the archive data of the application specified by the URL to the invariable software component. The invariable software component can extract the received archive file of the application if the signature of the archive file corresponds to the signature transferred by the main application. If the signature is, for example, a hash value, the invariable software component calculates the hash value for the received archive file of the application and compares the hash value of the received archive file with the hash value, transferred by the main application, of the archive file of the application.

After the unpacking of the archive file of the application, the invariable software component can pass on the application or a storage location of the application to the main application. The main application can in turn receive the storage location of the application and store it. In addition, the main application can change a graphic interface of the head unit in such a way that the application is displayed to the user of the head unit. The user can, for example, execute the application by means of a user interaction. For this purpose, the main application can load the application from the storage location and execute it. For the execution of the application, the application can in turn have a certificate with which the application has to prove its identity to the head unit before execution.

Additionally or alternatively, the loading of the applications into the head unit can, according to the method described above, take place continuously in specific time periods and/or as a function of specific events, without having to be triggered explicitly by a user of the head unit. As a result, the head unit can already communicate applications to the head unit before an explicit request by the user. The user can therefore execute the applications on the head unit more quickly where necessary, since the applications are already loaded onto and stored on the head unit.

In addition, the method described above makes secure transmission of the applications to the head unit possible. The security during the transmission of the applications can be improved by using two preferably encrypted communication channels of different components of the head unit. The use of archive files and the securing of the archive files with signatures prevents manipulation of the archive files during transmission. In addition, the invariable software component prevents the checking of the signatures from being able to be manipulated.

In addition, the method can be adapted efficiently to different vehicles and/or vehicle configurations. Both the main application and the applications or apps can be adapted efficiently and in an automated fashion to new vehicles and/or vehicle configurations. Installation of the main application and installation of the available applications can therefore take place in an automated fashion before the user of the vehicle uses it for the first time.

Furthermore, the main application can carry out updating of the applications. Updating of the applications can be based on the following criteria: time, user interaction, request by a server via a web-based message, and/or an SMS. If one or more criteria are met, the main application can download the list of metadata from the server again. The new list of metadata can compare the main application with the current list of metadata. When there are deviations between the lists of metadata, the main application can transfer the corresponding identifiers to the invariable software component, which downloads the applications from the server and passes them on to the main application according to the method described above. In this context, the existing application can be replaced by a new application. In other words: the existing application can be updated.

The possibility of dynamic updating of the applications permits the user to use new applications more easily. The user is therefore provided with the possibility of carrying out certain vehicle configurations by enabling additional applications or updating existing applications even after delivery of a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for introducing applications into a head unit of a vehicle, the method comprising the acts of:
    transmitting a first identifier by a software component of the head unit to a server via a first communication channel;
    receiving a main application in response to the transmission of the first identifier by the server;
    transmitting a vehicle identification number of the vehicle by the main application to the server via a second communication channel;
    receiving metadata associated with the vehicle identification number of the vehicle, wherein the metadata comprises one or more identifiers;
    transferring at least one identifier of the received metadata from the main application to the software component;
    communicating the at least one identifier of the received metadata by an invariable software component to the server via the first communication channel;
    receiving at least one application associated with the at least one identifier by the software component;
    storing the at least one application by the software component; and
    forwarding a storage location of the at least one application from the software component to the main application.

2. The method as claimed in claim 1, wherein the method further comprises at least one of the following:
    the first identifier denotes a storage location of the main application on the server;
    the software component is an invariable software component;
    the software component is a native software application of the head unit.

3. The method as claimed in claim 2, wherein the transmission of the first identifier takes place after a start of the invariable software component, after the start of a communication unit of the head unit, as a function of a time-based parameter and/or by way of an interaction of a user with the head unit.

4. The method as claimed in claim 1, wherein the first communication channel and the second communication channel are encrypted communication channels.

5. The method as claimed in claim 1, wherein the metadata comprises a URL relating to an application, a hash value of the application and/or a version number of the application.

6. The method as claimed in claim 1, wherein the receiving of the at least one application by the software component comprises:
    validation of an archive file of the application; and
    unpacking of the archive file if the validation of the archive file is successful.

7. The method as claimed in claim 1, wherein the method further comprises the act of:
    updating of the at least one application by the main application.

8. The method as claimed in claim 7, wherein the updating of the at least one application comprises the acts of:
    transmitting the vehicle identification number of the vehicle by the main application to the server via the second communication channel;
    receiving updated metadata associated with the vehicle identification number of the vehicle, wherein the updated metadata comprises one or more identifiers;
    comparing the updated metadata with the metadata;
    if the updated metadata deviates from the metadata, transferring at least one identifier of the updated metadata from the main application to the software component;
    communicating the at least one identifier of the updated metadata by the invariable software component to the server via the first communication channel;
    receiving at least one updated application associated with the at least one identifier by the software component; and
    forwarding the at least one updated application from the software component to the main application in order to replace the at least one application by the at least one updated application.

9. A head unit of a vehicle, wherein the head unit comprises instructions which, when executed, carry out the method as claimed in claim 1.

10. A vehicle, comprising a head unit, wherein the head unit comprises instructions which, when executed, carry out the method as claimed in claim 1.

* * * * *